United States Patent
Spägele

(10) Patent No.: US 6,491,138 B1
(45) Date of Patent: Dec. 10, 2002

(54) DISC BRAKE

(76) Inventor: Gerhard Spägele, Magister Angerer Weg 68, 6830 St. Johann, Tirol (AT)

( * ) Notice: Subject to any disclaimer, the term of this patent is extended or adjusted under 35 U.S.C. 154(b) by 0 days.

(21) Appl. No.: 09/726,930

(22) Filed: Nov. 30, 2000

(30) Foreign Application Priority Data

Nov. 29, 2000 (EP) ............................................. 00125314

(51) Int. Cl.$^7$ ............................................. F16D 55/46
(52) U.S. Cl. .................................... 188/70 B; 188/72.2
(58) Field of Search .............................. 188/72.2, 70 B

(56) References Cited

U.S. PATENT DOCUMENTS

| | | | |
|---|---|---|---|
| 2,864,468 A | 12/1958 | Dombeck ..................... | 188/70 |
| 3,285,372 A | 11/1966 | Rossmann ................... | 188/73 |
| 4,289,216 A | * 9/1981 | Shirai et al. ................ | 186/72.2 |
| 4,333,550 A | * 6/1982 | Shirai ......................... | 188/72.2 |
| 5,558,184 A | 9/1996 | Kullmann et al. .......... | 188/72.4 |

FOREIGN PATENT DOCUMENTS

| | | |
|---|---|---|
| DE | 1019873 | 11/1957 |
| DE | 1156664 | 10/1963 |
| DE | 1217707 | 5/1966 |
| DE | 1284731 | 12/1968 |
| DE | 2837634 | 3/1980 |
| JP | 56-6931 | 1/1981 |
| JP | 2-102933 | 4/1990 |

* cited by examiner

*Primary Examiner*—Matthew C. Graham
(74) *Attorney, Agent, or Firm*—The Maxham Firm

(57) ABSTRACT

A disk brake having a self-energized brake effect. The disk brake has a sectional lining with a self-energized power brake and made up of a rotating brake disk, a U-shaped stationary caliper enclosing the brake disk from the outside, brake shoes disposed in the caliper, the support plates of the brake shoes, which are connected to a brake lining, being pivotally held in a bearing arrangement, and an actuator disposed on the poles of the caliper for synchronously shifting and pressing the brake shoes against the faces of the brake disk, and inclined surfaces for a self-energized increase of the pressure of the brake shoes against the brake disk being provided in the advance path of the brake shoes. For obtaining an intended self-energizing effect of the brake effect with technically simple structure the radial distance between the bearing arrangement and the brake disk axis is larger than the radial distance between the centers of gravity of the application of force of the brake shoes and the brake disk axis freely movable within limits so that the brake shoes carry out a movement directed toward the circumference of the brake disk upon being pressed against the brake disk. The inclined surfaces are provided in the advance path of the brake shoes extending radially and translating the forces directed toward the circumference of the brake disk into additional pressure forces by a wedge effect.

14 Claims, 3 Drawing Sheets

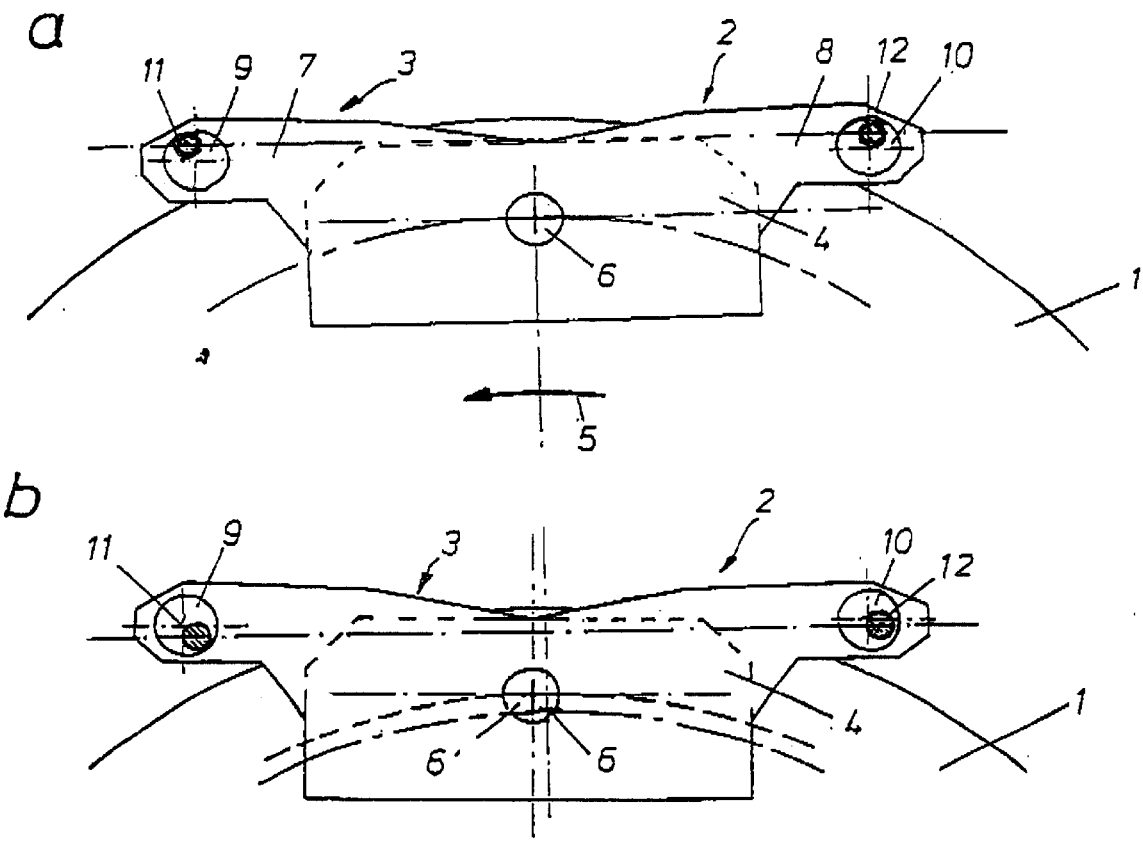
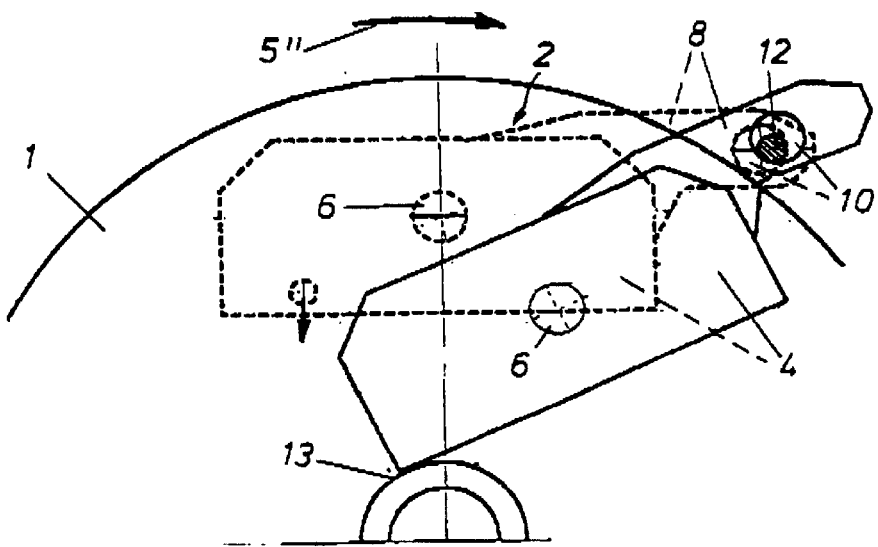

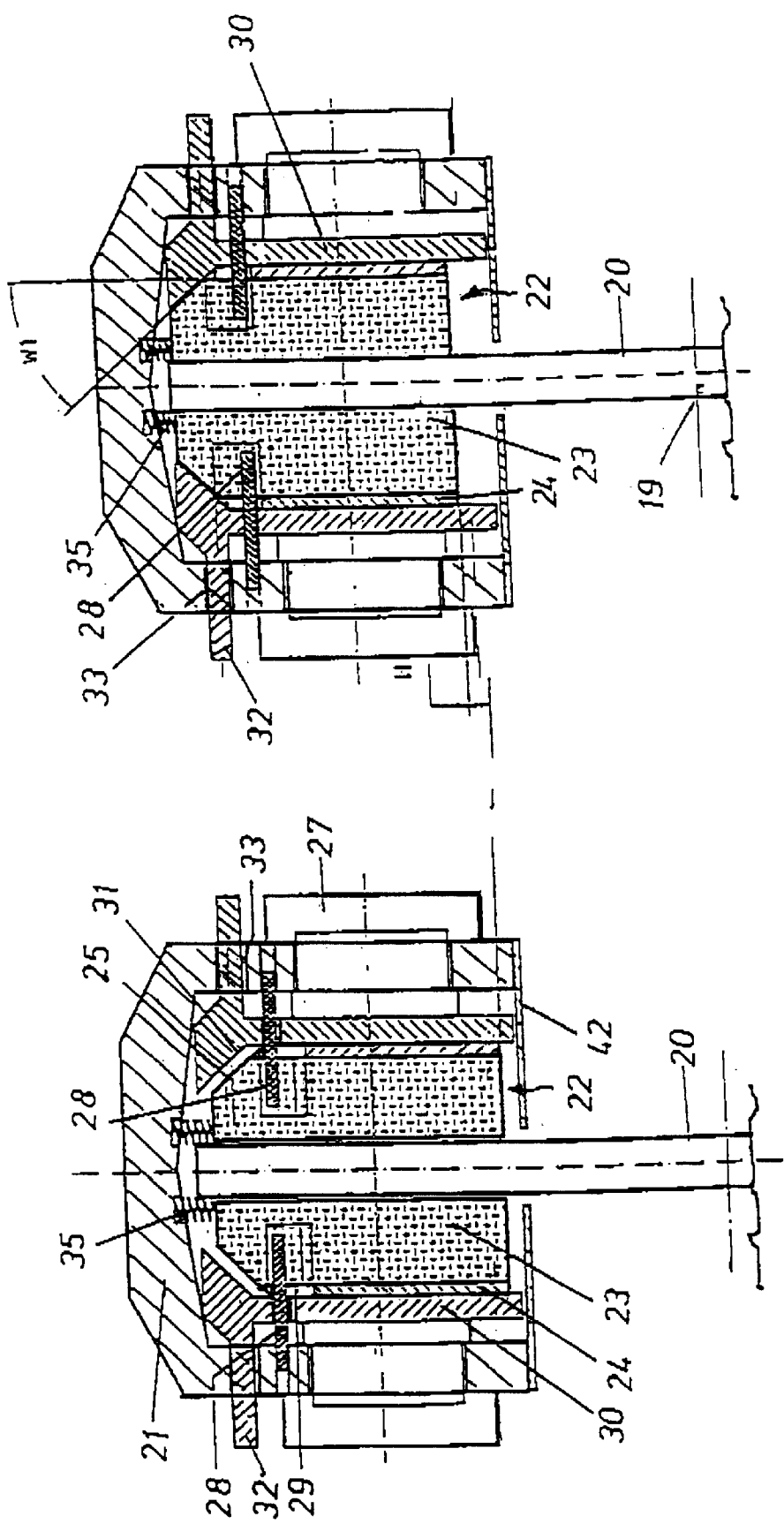

DISC BRAKE

BACKGROUND

1. Field of the Invention

The invention relates to a disk brake with a self-energized brake effect particularly for brake systems for vehicles and other technical devices.

2. Background Discussion

In disk brakes normally used, particularly in vehicles, the braking force is generated between the rotating brake disk and the brake shoe accommodated in the caliper by means of hydraulic, electric or pneumatic means, the pressure of which acts on at least one piston installed in the side wall of the stationary caliper. Due to the resulting piston movement the brake shoe directly or indirectly connected to it is pressed against the brake disk rotating with the axletree with its friction lining in parallel to the axle. In the so called floating caliper disk brakes two brake shoes or brake pads are simultaneously pressed against the plane-parallel faces of the respective brake disk. To achieve the required high braking forces the hydraulic piston/cylinder units and their main cylinders need to have relatively large dimensions, which requires mounting space and requires, accordingly, large operating forces on the brake pedal. Different systems of power brakes operated with servo power effect an automatic increase in the pressing forces of the brake shoes with comparably lower pedal operating forces and enable the usage of smaller hydraulic assemblies. Such power brake systems, however, are technically complex and expensive.

Although various disk brakes with an integrated power brake have become known, they have, however, generally not been introduced in practice and particularly in vehicle manufacturing since they obviously do not fully met the complex requirements in year-long driving service.

In German patent 1,284,731 a partially lined disk brake is described, the caliper of which is borne on a tappet fixed to the vehicle with an elongated pole so as to be axially movable. The piston of the hydraulic cylinder mounted in a caliper pole is provided with a pivotable pressure part which engages with a carrier plate of the one brake shoe and allows certain movements of the pressed-on brake shoe in the circumferential direction of the brake disk. The pivotable and axially movable carrier plate of hardened steel has a saw-tooth shaped corrugated profile, the elevations and valleys of the corrugation extending in the radial direction. A steel member fixed to the caliper pole has a corrugated profile adjusted thereto and is in positive engagement with the carrier plate. When the hydraulic cylinder is operated, the pivotally borne carrier plate is moved in the circumferential direction by a small amount due to the frictional engagement of the brake lining and the brake disk. The corrugations, which are thereby displaced with respect to each other, will cause a wedge effect and thus an increased contact pressure of the brake shoes, that is, an increased brake effect. An intended influence on this power brake effect is impossible and problems may arise, particularly in long-term service, due to caking and contamination of the two corrugations. Further, considerable manufacturing requirements must be fulfilled for such disk brakes.

For obtaining a self-energizing effect in a disk brake, German patent 1,019,873 proposes the provision of brake shoe guides contained in the caliper poles under an angle of more or less than 90° with respect to the plane-parallel brake disk faces and bearing the respective brake shoes in the guide of the caliper by means of rolling bodies. The amount of the self-energizing effect changes on its own by the pivotable formation of a pivoting shoe guide.

According to German patent publication 2,837,634 self-energizing of a disk brake may also be obtained by integrating a snap ring extending in the circumferential direction into the brake disk, the edges of the snap ring being inclined in certain angles with respect to the disk surface. Into the snap ring an accordingly wedge-shaped shoulder of the respective brake shoe is pressed, a force acting radially inward being generated by the interaction of the two inclined surfaces.

In Japanese patent abstracts 2-102933 and 56-6931 disk brakes are described, the brace disks of which are cone-shaped with the wall width increasing radially outwardly. The brake shoes, which are hydraulically movable in conventional calipers, can only carry out axial movements in the direction of the axis of the brake disk, and the shape of the brake linings is adjusted to the cone shaped profile of the brake disk. These brake disks have no self-energized braking action.

SUMMARY OF THE INVENTION

It is a primary purpose of the invention to provide a disk brake having a self-energized braking effect which has a particularly simple construction compared to known embodiments and by which an operationally safe and efficient self-energizing effect is obtained even in long-term use.

Since in the subject matter of the invention the distance between the bearing arrangement of the brake shoes and the brake disk axis is larger than the distance between the center of gravity of the application of force of the respective brake shoe and the brake disk axis, that is, the bearing arrangement is disposed radially outside of the centers of gravity of the application of force, the brake shoes are taken along by the rotating brake disk within the amount of their free movability and simultaneously moved about the pivot axis of the bearing arrangement by a predetermined value due to the frictional engagement of their brake linings. This movement leads to a radial displacement of the center of gravity of the application of force of the brake shoes to the outside with respect to the brake disk. Since the faces of the brace disk interacting with the brake linings on the brake shoes have a predetermined inclination with respect to the axis of the brake disk, the motion of the brake disk results in an increased contact pressure of the brake linings, which means a correspondingly increased braking effect.

The disk brake according to the invention is particularly suited for an assembly into vehicles with one or more tracks since its constructive requirements and its dimensions are approximately equal to those of conventional vehicle disk brakes and therefore no problems concerning positioning in the vehicles will arise and the assembly may also be effected in the common way. The disk brake according to the invention may particularly efficaciously be used as a so called locking brake or overunning brake in different types of trailers since the self-energizing effect occurs even with the slightest rotational movements of the wheels and their brake disks and even with only a small contact pressure of the brake linings in the beginning and will increase progressively.

The self-energizing effect obtainable according to the invention may be selected so that the pressure forces acting only axially on the brake shoes may be drastically decreased as compared to conventional disk brakes. Thus, there arises the possibility to omit the hydraulic power generators so far regarded as absolutely necessary in vehicle manufacturing and to replace them by simpler and cheaper mechanical or electromagnetic actuating systems. Besides, the dimensions of the different devices may be decreased or the hydraulic pressures lowered, or both, while maintaining the hydraulic power generators, which in both cases will have advantageous effects on the manufacturing costs and the safety of operation. Since the actuation forces required for generating the brake effect are relatively small compared to the corresponding actuation forces of conventional brake systems, fluid transmission means, that is, hydraulics or pneumatics, including all related additional devices, may be omitted. Instead, electric actuator motors or solenoids acting directly or indirectly on the brake shoes may be provided on the brake calipers for power generation. With such a use of electric actuation and transmission means in vehicle combinations (towing vehicle and trailer) for which overrunning brake systems are mandatory, so called "continuous" brake systems as are mandatory in larger vehicle combinations may be designed with the realization of the disk brake according to the invention.

In the disk brake according to the invention the two brake shoes disposed laterally adjacent to the brake disk are borne in a "floating" manner and can be moved in the tangential direction with respect to the brake disk within predetermined limits. Those movements are effected by a clinging of the brake shoe to the rotating brake disk during the start of the braking operation, the amount of the movement being limited by the interaction of a stopper bolt of the respective brake shoe in a stopper bore of larger diameter.

Compared to known embodiments the disk brake of the invention has the particular advantage that high braking forces or brake effects are obtained by means of relatively small actuating forces even over longer operating times. Since the increased brake forces preferably act in the rotational direction of the disk, the pressure forces oriented parallel to the axis and generated by the hydraulic or pneumatic components may be reduced which enables a lighter construction of the brake calipers. Another advantage resides in the use of the disk brakes according to the invention in combination with common mechanical overrunning means of trailers, whereby a good adjustment of the overall braking reaction of towing vehicle and trailer is obtained since both may be provided with disk brakes. While in conventional brake systems for towing vehicles and trailers different media were required for controlling and operating the individual devices, which rendered a considerable technical complexity necessary, the use of the disk brake principle according to the invention in complex vehicle systems, such as towing vehicles with trailers attached to them, makes it possible to omit various devices and components, which results in a reduction of manufacturing costs while maintaining at least the same safety of operation. Furthermore, for the first time so called continuous brake systems become feasible even for simple vehicle combinations which previously could only be provided with non-continuous overrunning brake systems.

For commercial vehicle combinations so called continuous brake systems, in which the control and operation of the brakes are transferred to the trailer through the towing vehicle by means of conduits, and the brakes of the trailer work in synchronism with the brakes of the towing vehicle, are prescribed by law. In lighter combinations of towing vehicle and trailer without such continuous brake systems the trailers are provided with so called overrunning brakes. During the operation of the brakes of the towing vehicle the trailer, which is not braked in the beginning, will apply a thrust force to the towing vehicle through its draw-bar. That thrust force is used to generate the actuating forces for the wheel brakes of the trailer in the above overrunning brake systems. When such a towing vehicle/trailer combination is to drive backward from a standstill, the driver previously had to get out of the towing vehicle to activate a mechanical lock on the draw-bar of the trailer to prevent an actuation of the trailer's brakes by the thrust forces applied to the trailer by the towing vehicle during reverse travel.

Modem vehicles or vehicle combinations are required to be provided with so called reverse gear automatics which will automatically release the wheel brakes of the trailer during reverse travel. At the start of the reverse movement of the towing vehicle the draw-bar of the trailer is pushed together by prescribed amounts, which causes a limited advance movement of the brake shoes in the direction of the brake surfaces, for example, via mechanical lever rod assemblies, without generating any other perceptible brake effect (compare German patent publication 196 09 629).

According to an important aspect of the invention reverse gear automatics are realized in a technically simple way by supporting the brake shoes with only one bearing arrangement on the rear side with respect to the normal turning direction so that they are freely movable in a limited way. When an inversion of the turning direction of the wheel and with it of the brake disk occurs with this hinging of the movable brake shoe, the respective brake shoe is moved radially inward in the direction toward the rotational axis of the brake disk due to the effect of the wedge surfaces. Since the wall thickness of the brake disk continually decreases toward the radially inner side, a correspondingly larger clearance is created for the brake shoes. Since the advance path of the brake shoes generated by the hydraulic actuation cylinders is always limited, a position in which the brake linings are free from the active surfaces of the brake disk, and therefore no braking effect is present any longer, is reached due to the radial movement of the brake shoes to the inside. Thus, a trailer provided with the disk brake of the invention suspended on one side enables an automatic release of the trailer brakes during reverse travel. When the vehicle combination runs forward again, the normal positioning of the brake linings is self-restored during the following braking operation, and upon operation of the brake pedal the brake system of the towing vehicle and of the trailer works with the self-energized power brake in the way described above.

BRIEF DESCRIPTION OF THE DRAWING

Further particularities, objects, advantages and features of the invention will be more clearly understood from the following detailed description, when read in conjunction with the accompanying drawing, in which:

FIGS. 1a and 1b are schematic illustrations of the functional principle of the disk brake according to the invention;

FIG. 2 shows the functional principle of a disk brake according to the invention with a one-sided suspension of the brake shoe during reverse travel for the use in prescribed brakes provided with reverse gear automatics;

FIGS. 3a, 3b are schematic cross sectional views of an embodiment of the disk brake according to the invention in the released and in the locked operating states, respectively;

DETAILED DESCRIPTION OF THE PREFERRED EMBOIDMENTS

Figure 4:
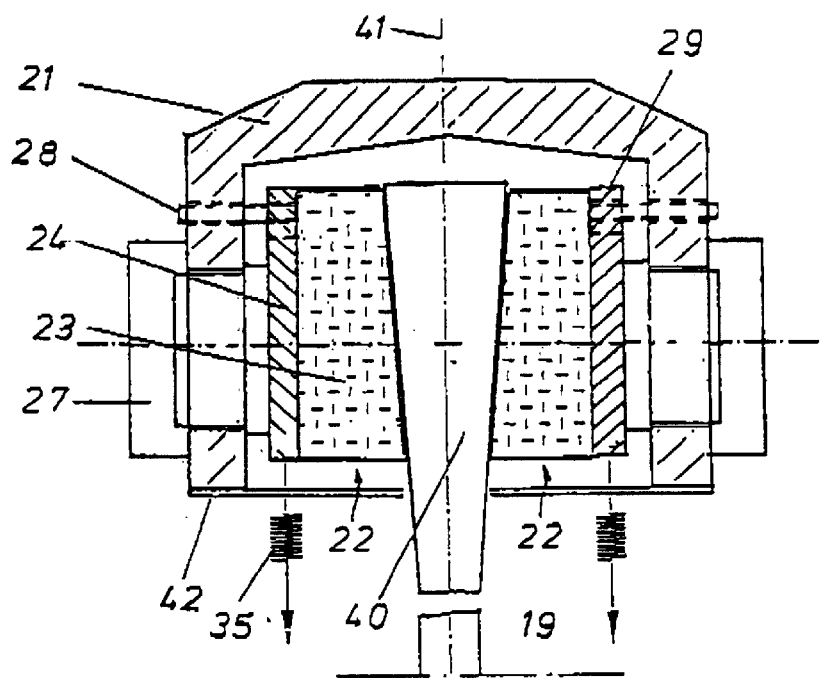
FIG. 4 is a schematic cross-sectional view of an alternative embodiment of the disk brake according to the invention.

FIGS. 1a, 1b schematically show a part of brake disk 1 together with brake shoe 2 consisting of specially formed support plate 3 and partially shown brake lining 4 attached to it. The turning direction of brake disk 1 is illustrated by arrow 5 and the center of gravity of the application of force of the brake lining on the face of the brake disk is indicated by circle 6. Support plate 3 is provided with two clips 7, 8 protruding to the front and to the back in the turning direction of the brake disk, holes 9, 10 being formed in the end section of each of the clips, respectively. Each of the holes accommodates support tappet 11, 12 fixed in the caliper (not shown). As illustrated, the diameters of support tappets 11, 12 are smaller than the diameters of holes 9, 10 in clips 7, 8 of the support plate.

In the operating state shown in FIG. 1a brake shoe 2 is offset from rotating brake disk 1, that is, the disk brake is released. This is effected by the forces of built-in springs which bias the brake shoe to the released position.

For realizing a braking operation brake shoes 2 are displaced parallel to the axis of the brake disk by their actuating mechanism (not shown in FIG. 1) and pressed to the respective face of the brake disk with brake linings 4. Due the friction between the active face of brake disk 1 and brake lining 4 generated by only a small pressure, brake shoe 2 is moved from the position shown in FIG. 1a to the position according to FIG. 1b in a plane parallel to the brake disk. At that time the brake shoe carries out a certain pivotal movement about support tappet 12 (right side in the drawing), and simultaneously certain translatory entraining motion of brake shoe 2 is effected, the amount of those movements being limited by the diameter differences between support tappets 11, 12 and bores 9, 10. As a result of these movements the brake shoe is moved radially outward by a certain amount with respect to brake disk 1 so that its center of gravity 6' is laterally displaced in the turning direction and also radially to the outside, which is indicated by a broken outline of the circumference in FIG. 1b. It is important here that the radial displacement of the brake shoe to the outside with respect to the brake disk will become effective in a correspondingly increased manner even in the case of very high contact pressure forces of the brake shoe in the direction parallel to the axis.

Due to the "floating" support of brake shoe 2 by means of clips 7, 8 of support plate 3 on stationary support tappets 11, 12, the same effects as described above will also be obtained in the case of a reversal of the turning direction of the brake disk, that is, the self-energized power brake effect will also be obtained during reverse travel.

The disk brake shown in FIG. 2 substantially corresponds to the embodiment of FIG. 1, with functionally equivalent components being indicated by the same reference numerals. In the embodiment according to FIG. 1 brake shoes 2 or brake linings 4 are attached to two bearing arrangements 9, 11 and 10, 12, with their respective support plate 3 through clips 7 and 8 on both its ends to be freely movable in a limited way and thereby a self-energizing effect is generated in both turning directions. Brake shoes 2 of the disk brake are one-sidedly hinged to the caliper or another appropriate stationary component in only one bearing arrangement so as to be freely movable in a limited way. Accordingly, support plate 3 of brake lining 4 is provided with only one clip 8 which extends laterally opposed to the forward turning direction, that is, to the right in FIG. 2, and has in its end portion the bearing arrangement formed of larger bore 10 and narrower support tappet 12.

During forward travel this brake embodiment functions like the one according to FIG. 1, that is, upon actuation of the brake, brake shoe 2 carries out a motion directed radially to the outside with respect to brake disk 1 which will then lead to the desired self-energizing effect due to the cone-shaped cross-section of the brake disk shown, for example, in FIG. 4.

When the turning direction of brake disk 1 is reversed in FIG. 2 in accordance with arrow 5" during reverse travel, the brake disk tends to take along the brake shoes due to the frictional engagement with the adjacent brake linings. Since in this case also the radial distance of bearing arrangement 10, 12 to the rotational axis of the brake disk is larger than the radial distance between the center of the application of force 6 to the axis of the brake disk brake shoes 2 are pivoted radially inwardly in their bearing arrangement from the normal position shown by a broken line to the position shown by continuous lines. If the brake disk shown in FIG. 4 is used the wall thickness of which decreases uniformly toward the radially inner side, brake linings 4 are released from the active surfaces of the brake disk by this movement directed radially to the inside, which means that the brake is automatically released during the start of the reverse travel. The radial movement of the brake shoes to the inside is limited by stoppers, such as stopper 13, for example. In the illustrated released position wheel brake cylinders 27 (compare FIG. 2) are ineffective since their piston path is conventionally limited by end stoppers. The disk brake shown in FIG. 2 is therefore provided with reverse travel automatics as prescribed for certain types of trailers, and that without additional components. With this brake embodiment the free play of bearing arrangement 10, 12, that is, the difference between the diameters of support tappet 12 and bore 10, may be minimized.

In the disk brake illustrated in a schematic cross-sectional view in FIGS. 3a, 3b, the functional principle described above with reference to FIGS. 1 and 2 is realized. Brake disk 20 has plane-parallel faces, that is, a uniform thickness. In U-shaped caliper 21 surrounding the radially outer part of the brake disk are brake shoes 22 comprised of brake lining 23 and support plate 24, which are formed in accordance with FIG. 1 and are disposed on both sides of the brake disk. Each brake lining 23 is provided with cone-shaped part 25 with inclined outer surfaces in its upper section. In this embodiment conventional hydraulic cylinders 27 are disposed in one pole of the caliper 21, and serve as actuating mechanisms for the pressing movements of brake shoes 22 parallel to the axis against the faces of brake disk 20. Further, support tappet 28 is disposed in each pole of caliper 12, the tappets corresponding to support tappets 11, 12 shown in FIGS. 1, 2, and being disposed in the lateral positions illustrated therein, which is indicated by a cross-hatched illustration of support tappets 28. The inner end portions of support tappets 28 pass through bores 29 in support plates 24, the bores, in accordance with FIGS. 1 and 2, having a larger diameter that support tappets 28 and allowing limited free movements of brake shoes 22 with respect to caliper 21. Instead of hydraulic cylinders 27 a mechanical, electromagnetic or pneumatic actuating mechanism may be provided.

In this embodiment a respective specially formed contact pressure plate 30 is provided between each support plate 24 and the contact pressure member of hydraulic actuating cylinder 27. Contact pressure plate 30 is formed with inclined surfaces 31 directed to the inside, opposing the outer surface of cone-shaped brake shoe portion 25 and having generally the same inclination. Further, each contact pressure plate 30 has guide tappet 32 protruding to the outside in the upper plate section, the guide tappet being guided in bore 33 of the associated caliper pole so that support plate 24 may carry out movements parallel to the axis upon activation of hydraulic cylinder 27 and transfers the pressure forces to the respectively associated brake shoe 22. Further, a respective pressure spring 35 is disposed in the upper connecting bridge of caliper 21, the springs applying a bias pressure directed radially inwardly to associated brake shoe 22 and keeping the brake shoes in the released normal position shown in FIG. 3a or returning the brake shoes into the normal position after they have been released.

Upon actuation of hydraulic cylinders 27 the functional principle explained above with reference to FIGS. 1a, 1b and 2 becomes effective, and brake shoes 22 are radially displaced to the outside by the amount H with respect to brake disk 20 from their position according to FIG. 3a to the position according to FIG. 3b. At that time the outer surfaces of cone-shaped end portions 25 of brake shoes 22 come into pressure contact with inner surfaces 31 of contact pressure plates 30 inclined in the same angle W1, and the wedge effect obtained in this way results in a contact pressure of the two brake linings against the active faces of brake disk 20 acting parallel to rotational axis 36 of the brake disk so that the desired self-energizing effect is obtained.

The disk brake schematically shown in a cross sectional view in FIG. 4 substantially corresponds to the embodiment of FIG. 3, the components equivalent to those of the FIG. 3 embodiment being indicated by the same reference numerals. The technically important difference of this disk brake compared to the embodiment according to FIG. 3 is that the brake disk is formed in a continuous cone shape with a wall thickness decreasing radially toward the inside, at least in its active radially outer section, the two faces being inclined in a relatively small angle toward central plane 41 of brake disk 40. Brake shoes 22 are provided with a correspondingly inclined, continuously plane contact surface. Due to the cone-shaped form of brake disk 40 the special contact pressure plates provided in the embodiment of FIG. 3 may be omitted so that the pressure members of hydraulic cylinders 27 will directly act on support plates 24 of brake shoes 22. The bearing or suspension of the two brake shoes is effected by means of support tappets 28, shown in FIGS. 1a, 1b and 2, and their two or one support plate clip(s) attached to the poles of caliper 21. Due to the, in limits, freely movable and pivotable bearing of brake shoes 22 on associated support tappets 28, the radial displacement motion of the brake shoes to the outside upon generation of the axial contact pressure of brake linings 23 against the correspondingly inclined faces of brake disk 40 is obtained in this embodiment, too. This leads to a wedge effect and thus to an increased contact pressure due to the pairing of opposed inclined surfaces. To intentionally return the brake shoes into their released original position shown in FIG. 1a after completion of the braking operation, springs 35 are provided, which are formed as tension springs in this case. Stopper plate 42 attached to the lower ends of the two caliper poles, which is also provided in the embodiment according to FIG. 3, serves as an additional safety measure for the movements caused by springs 35.

Figure 5:
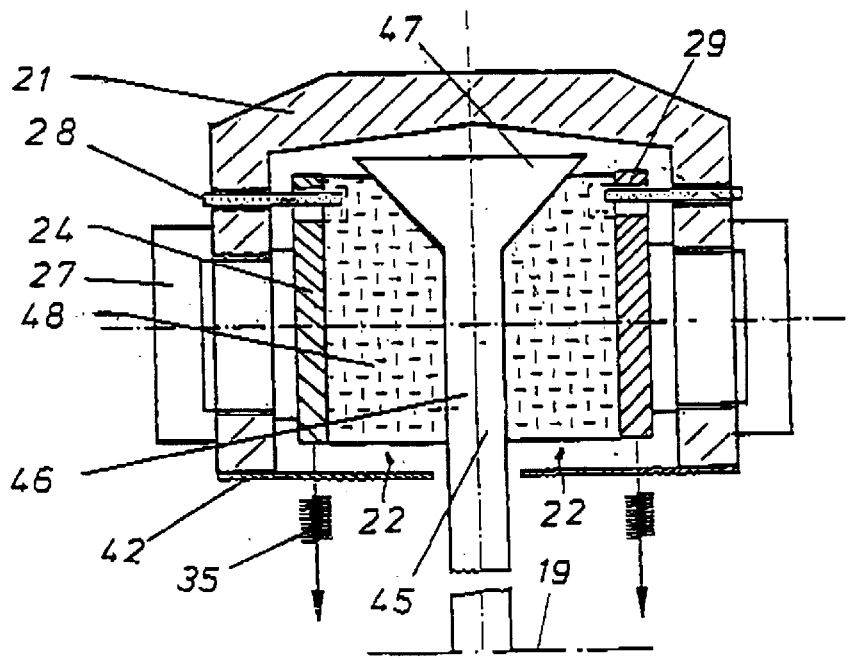
FIG. 5 is a schematic cross-sectional view of yet another embodiment of the invention.

The disk brake shown in FIG. 5 largely corresponds to the embodiment according to FIG. 4. Brake disk 45 is provided with a plane-parallel, radially inner section 46 and cone shaped section 47 at its outer peripheral section. Brake linings 23 of brake shoes 22 are correspondingly shaped, that is, they are provided with radial inner section 48 with a brake surface extending parallel to the plane surface of the brake disk, as well as radially extending outer section 49 having an active surface parallel to the associated cone-shaped surface of brake disk 45. In this embodiment an increased contact pressure of the two brake linings against the partial surfaces of the brake disk and thus, similar to the above embodiments, a self-energizing effect is obtained by a radial displacement motion of the two brake shoes to the outside in accordance with FIGS. 1a, 1b.

The invention is not limited to the above described embodiments but also includes other combinations of individual features of the illustrated disk brakes. When a brake effect including a self-energizing effect is desired in only one rotational direction of the brake disk, only one bearing arrangement—the rear one with respect to the turning direction—may be used. Further, in the case of an appropriate formation of the brake linings, a single bearing arrangement in the shape of a pendulum-suspension of the two brake shoes may be provided. Finally, in certain variations the free movability of the brake shoes in the stationary caliper limited by the thinner support tappets and the larger bearing holes may be achieved by means of other technical measures, such as, for example, double cams or the like.

What is claimed is:

1. A disk brake with sectional lining including a self-energized power brake, the disk brake comprising:

a rotating brake disk having confronting faces and an axis;

a U-shaped stationary caliper enclosing said brake disk from the outside, said caliper having poles;

brake shoes disposed in said caliper, said brake shoes having support plates which are connected to a brake lining and are pivotally held in a bearing arrangement;

actuation means disposed on said poles of said caliper for synchronously shifting and pressing said brake shoes against said faces of said brake disk, the radial distance between said bearing arrangement and said brake disk axis being larger than the radial distance between the centers of gravity of the application of force of said brake shoes and said brake disk axis so that said brake shoes are freely movable within limits and carry out a movement in the direction toward the circumference of said brake disk when pressed against said brake disk;

inclined surfaces for a self-energized increase of the pressure of said brake shoes against said brake disk, said inclined surfaces being provided in the advance path of said brake shoes and extending radially and translate the forces directed toward the circumference of said brake disk into additional contact pressure forces by means of a wedge effect; and wedge plates comprising inclined surfaces on their inner sides which correspond to the inclined surfaces on the outer sides of said brake shoes, said wedge plates being disposed between said brake shoes and said poles of said caliper, wherein said wedge plates are held in said poles of said caliper by tappets so as to be transversely shiftable.

2. The disk brake according to claim 1, further comprising bias springs acting radially toward the inside of said brake shoes.

3. A disk brake with sectional lining including a self-energized power brake, the disk brake comprising:

a rotating brake disk having confronting faces and an axis;

a U-shaped stationary caliper enclosing said brake disk from the outside, said caliper having poles;

brake shoes disposed in said caliper, said brake shoes having support plates which are connected to a brake lining and are pivotally held in a bearing arrangement;

actuation means disposed on said poles of said caliper for synchronously shifting and pressing said brake shoes against said faces of said brake disk, the radial distance between said bearing arrangement and said brake disk axis being larger than the radial distance between the centers of gravity of the application of force of said brake shoes and said brake disk axis so that said brake shoes are freely movable within limits and carry out a movement in the direction toward the circumference of said brake disk when pressed against said brake disk; and inclined surfaces for a self-energized increase of the pressure of said brake shoes against said brake disk, said inclined surfaces being provided in the advance path of said brake shoes and extending radially and translate the forces directed toward the circumference of said brake disk into additional contact pressure forces by means of a wedge effect;

wherein said bearing arrangement of said brake shoes comprises at least one stationary support tappet which is accommodated in a bore in said support plate of said brake shoe so as to be freely movable in a limited way.

4. The disk brake according to claim 3, further comprising wedge plates comprising inclined surfaces on their inner sides which correspond to the inclined surfaces on the outer sides of said brake shoes, said wedge plates being disposed between said brake shoes and said poles of said caliper.

5. The disk brake according to claim 4, wherein said wedge plates are held in said poles of said caliper by tappets so as to be transversely shiftable.

6. The disk brake according to claim 3, wherein said wedge surfaces are formed on said brake disk and correspondingly on said inner side of said brake shoes.

7. A disk brake with sectional lining including a self-energized power brake, the disk brake comprising:

a rotating brake disk having confronting faces and an axis;

a U-shaped stationary caliper enclosing said brake disk from the outside, said caliper having poles;

brake shoes disposed in said caliper, said brake shoes having support plates which are connected to a brake lining and are pivotally held in a bearing arrangement;

actuation means disposed on said poles of said caliper for synchronously shifting and pressing said brake shoes against said faces of said brake disk, the radial distance between said bearing arrangement and said brake disk axis being larger than the radial distance between the centers of gravity of the application of force of said brake shoes and said brake disk axis so that said brake shoes are freely movable within limits and carry out a movement in the direction toward the circumference of said brake disk when pressed against said brake disk; and inclined surfaces for a self-energized increase of the pressure of said brake shoes against said brake disk, said inclined surfaces being provided in the advance path of said brake shoes and extending radially and translate the forces directed toward the circumference of said brake disk into additional contact pressure forces by means of a wedge effect;

wherein said support plates of said brake shoes are held in two end side bearing arrangements.

8. The disk brake according to claim 7, further comprising wedge plates comprising inclined surfaces on their inner sides which correspond to the inclined surfaces on the outer sides of said brake shoes, said wedge plates being disposed between said brake shoes and said poles of said caliper.

9. The disk brake according to claim 8, wherein said wedge plates are held in said poles of said caliper by tappets so as to be transversely shiftable.

10. The disk brake according to claim 7, wherein said wedge surfaces are formed on said brake disk and correspondingly on said inner side of said brake shoes.

11. A disk brake with sectional lining including a self-energized power brake, the disk brake comprising:

a rotating brake disk having confronting faces and an axis;

a U-shaped stationary caliper enclosing said brake disk from the outside, said caliper having poles;

brake shoes disposed in said caliper, said brake shoes having support plates which are connected to a brake lining and are pivotally held in a bearing arrangement;

actuation means disposed on said poles of said caliper for synchronously shifting and pressing said brake shoes against said faces of said brake disk, the radial distance between said bearing arrangement and said brake disk axis being larger than the radial distance between the centers of gravity of the application of force of said brake shoes and said brake disk axis so that said brake shoes are freely movable within limits and carry out a movement in the direction toward the circumference of said brake disk when pressed against said brake disk; and inclined surfaces for a self-energized increase of the pressure of said brake shoes against said brake disk, said inclined surfaces being provided in the advance path of said brake shoes and extending radially and translate the forces directed toward the circumference of said brake disk into additional contact pressure forces by means of a wedge effect;

wherein said support plates of said brake shoes are held in a bearing arrangement disposed at the end section of the respective support plate.

12. The disk brake according to claim 11, further comprising wedge plates comprising inclined surfaces on their inner sides which correspond to the inclined surfaces on the outer sides of said brake shoes, said wedge plates being disposed between said brake shoes and said poles of said caliper.

13. The disk brake according to claim 12, wherein said wedge plates are held in said poles of said caliper by tappets so as to be transversely shiftable.

14. The disk brake according to claim 11, wherein said wedge surfaces are formed on said brake disk and correspondingly on said inner side of said brake shoes.

* * * * *